Oct. 6, 1970   W. N. CLOTFELTER ET AL   3,531,982
APPARATUS FOR THE DETERMINATION OF THE EXISTENCE OR
NON-EXISTENCE OF A BONDING BETWEEN TWO MEMBERS
Filed March 26, 1968

WAYMAN N. CLOTFELTER
BENJAMIN F. BANKSTON
*INVENTOR(S)*

*ATTORNEYS*

United States Patent Office 3,531,982
Patented Oct. 6, 1970

3,531,982
APPARATUS FOR THE DETERMINATION OF THE EXISTENCE OR NON-EXISTENCE OF A BONDING BETWEEN TWO MEMBERS
Wayman N. Clotfelter and Benjamin F. Bakston, Huntsville, Ala., assignors to the United States of America as represented by the Administrator of the National Aeronautics and Space Administration
Filed Mar. 26, 1968, Ser. No. 716,183
Int. Cl. G01h *13/00*
U.S. Cl. 73—67.2           6 Claims

ABSTRACT OF THE DISCLOSURE

A device for testing the quality of a bond between a high density material and a low density material. The device includes a coupler consisting of a material having predetermined mechanical impedance approximating the mechanical impedance of the low density material. An electro-mechanical transducer is placed in contact with the coupler and is energized from the output of the variable frequency oscillator. The coupler is placed in intimate contact with the low density material so as to convey mechanical vibrations from said electro-mechanical transducer to the low density material and to receive reflected vibrations from said low density material. A microphone is also positioned on the coupler to convert the mechanical vibrations induced therein into an electrical signal. Means are provided for varying the frequency of the oscillator until it coincides with one of the resonant frequencies of said low density material and indicating means are provided for indicating the amplitude and frequency of said resonant frequency.

The invention described herein was made by employees of the United States Government and may be manufactured and used by or for the Government for governmental purposes without the payment of any royalties thereon or therefor.

BACKGROUND OF THE INVENTION

The invention relates to a resonant inspection apparatus for inspecting and checking bonded material and more particularly to an apparatus for inspecting the quality of the bond between a low density material and high density material.

The invention has particular utility in the testing of the bond between a metal panel on which is sprayed a foam composite which may have a density of the order of only two or three pounds per cubic foot. During the fabrication of such articles a lack of bond between the metal and the foam may occur because of improper temperature of the foam composite or by too rapid cooling of the finished article. The debonded parts of the foam are unattached or insufficiently attached to the metal and can flex inwardly and outwardly under facewise pressure. Obviously such regions constitute weaknesses and defects that cannot be tolerated.

Resonant inspection methods for inspecting and testing bonds are well known in the art and are described for instance in the U.S. Pat. No. 2,903,886 filed Feb. 10, 1955 under the title "Apparatus for the Determination of the Existence or Non-Existence and the Quality of a Bonding Between Two Parts or Members." According to these methods, frequency modulated mechanical vibrations are transmitted to the test body and the amplitude variations of the resonant peaks of the output detected signal indicate the quality of the bond. These methods however have depended on the use of a high mechanical impedance transducer in intimate contact with the test body. If such a device is used in checking the bond between a high density material and a low density material unsatisfactory results have occurred for the following reasons. If the transducer is placed on the high density material side of the test body the presence or absence of a low density material on the opposed side of the high density material has little effect on the vibrating metal and therefore the variation of the amplitude of resonant frequency is quite small. If the transducer is placed on the low density side of the material, the mechanical impedance mismatch between the transducer and the low density material is too great causing difficulty in transmitting the mechanical vibrations of the transducer to the test body.

SUMMARY OF THE INVENTION

It is now proposed to provide a simple and reliable means for determining the amplitude variations of the resonant frequency of a panel consisting of a high density material bonded to a low density material and thereby eliminate the foregoing difficulties. More particularly, this is to be accomplished by the novel technique of inducing mechanical vibrations into the low density side of the panel through a coupler having a transducer and a pickup as an integral part thereof. This technique coupled with the use of a coupler having a predetermined mechanical impedance approximating the mechanical impedance of the low density material allows the coupler to be placed in intimate contact with the low density material so as to convey the mechanical vibrations induced therein to the low density material and to receive reflected vibrations from the density material with minimum power loss.

Accordingly, it is an object of this invention to provide an accurate and dependable inspection apparatus for checking bonded materials comprising a low density material bonded to a high density material.

BRIEF DESCRIPTION OF THE DRAWINGS

These and other objects and advantages of the present invention will be more apparent upon reference to the following specification, appended claims and drawings wherein:

DESCRIPTION OF THE PREFERRED EMBODIMENT

Figure 1:
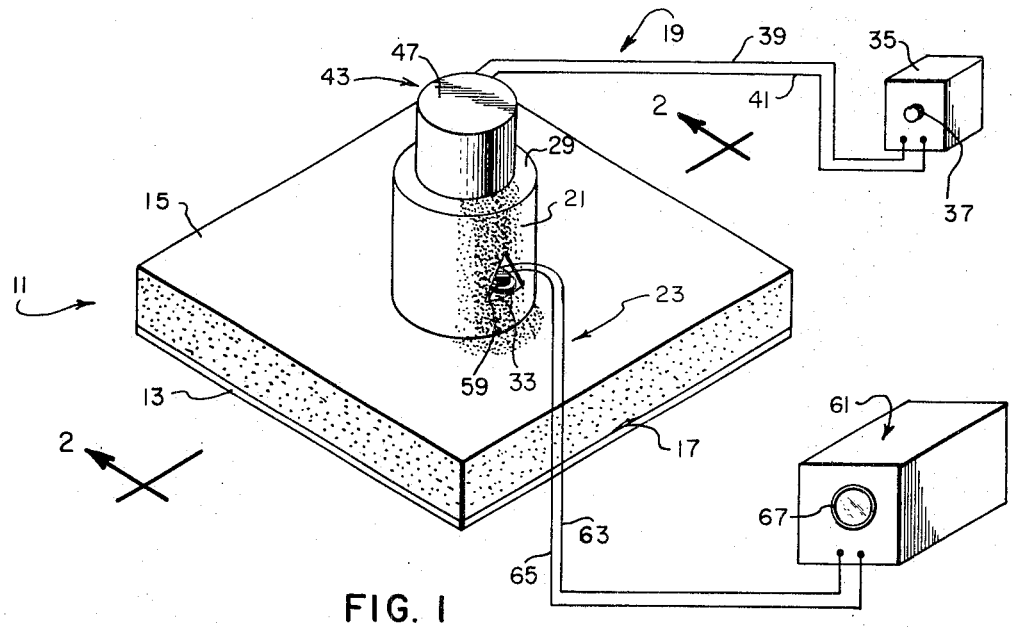
FIG. 1 is a perspective view of a resonant inspection apparatus according to the present invention.

Referring to FIG. 1, one of the articles that is to be inspected by the present invention is illustrated as comprising a panel 11, consisting of a plate of metal 13 on which is sprayed a foam composite 15. Because of the aforementioned difficulties in the manufacture of such assemblies, it is not always possible in high speed production to secure perfect bond between all portions of the foam composite in the metal panel. This kind of defect is shown in an exaggerated manner at 17 in FIG. 1. In reality, this debond is generally so minute as to be difficult to detect by conventional inspection means, especially in view of the aforementioned difficulties incurred in attempting to utilize conventional inspection means in testing low density materials.

Figure 2:
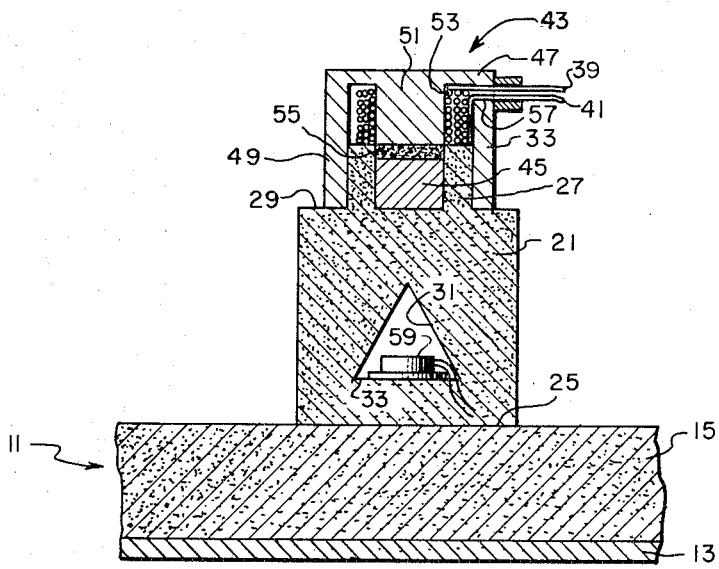
FIG. 2 is a longitudinal substantially central section of the apparatus of FIG. 1.

In order to rapidly and accurately ascertain whether such as other defects in the bond between the metal and the foam composite of the panels are present, the novel apparatus of the present invention is, so far as concerns all essential elements shown in FIGS. 1 and 2. The apparatus includes a means for producing variable frequency mechanical vibrations generally indicated at 19, a coupler 21 for receiving these mechanical vibrations and transmitting the same to the panel 11 and means generally indicated at 23 for sensing the amplitude and frequency of the vibrations that are reflected back from the panel to the coupler.

The coupler 21 consists of a material having a predetermined mechanical impedance approximating the mechanical impedance of the low density material to be subjected to mechanical vibrations. As shown in FIGS. 1 and 2, the coupler 21 consists of a foam material that is generally cylindrical in shape and has a flat lower surface 25 adapted to be placed in intimate contact with the foam composite 15 over the area of the panel to be tested. The upper portion of the coupler is of tubular formation as shown at 27, said tubular portion being of less diameter than the lower portion of the coupler so as to provide annular shoulder 29. The lower portion of the coupler is provided with a cavity 31 for presenting shoulder 33 parallel to the plane defined by surface 25. Preferably though not necessarily the cavity 31 extends through the diameter of the coupler and is generally triangular in shape.

The vibration inducing means 19 includes a variable frequency audio-oscillator 35. Such oscillator, which is designed to give a voltage of substantially constant amplitude over its entire frequency range, is provided with a tuning dial 37 which allows it to be adjusted to deliver a voltage of any desired frequency between 20 and 20,000 cycles per second. The output from the audio-oscillator is delivered to lead wires 39 and 41 which feed an electromechanical transducer generally indicated at 43.

As shown in FIG. 2, the transducer 43 includes a driven element 45 consisting of a magnetic material and an electromagnetic cup core 47 having an end portion of tubular formation as shown at 49 and having a center post 51 on which is wound solenoid 53. In the now preferred embodiment of the invention, the driven element 45 comprises a permanent magnet that is disposed within the bore of the tubular portion 27 of the coupler 21 with its magnetic poles aligned in a vertical direction. A plug 55, consisting of a foam material is inserted over the magnet and is adhesively bonded to the coupler. The depth of the bore of the tubular portion 27 is such as to dispose the upper face of the plug flush with the upper surface of the tubular portion 27.

The electro-magnetic cup core 47 has formed in its wall an opening 57 through which extend leads 39 and 41, which leads are connected to opposite ends of the solenoid 53. The electro-magnetic cup core 47 is inserted over the tubular portion 27 of the coupler 21 and rigidly affixed thereto such as by adhesive so as to inhibit relative movement between the cup core and the coupler. Preferably the height of the tubular portion 27 is such as to receive the face of the center post 51 flush with the upper face of the plug 55 and to receive the lower surface of the tubular portion 49 flush with the annular shoulder 29.

The means for sensing the vibrations induced in the coupler 21 includes a pickup, such as a contact microphone 59. As shown in FIGS. 1 and 2, the microphone is supported by the shoulder 33 and is preferably adhesively bonded thereto. The microphone converts the mechanical vibrations induced in the coupler into an electrical signal which is fed to indicating means 61 by leads 63 and 65. The indicating means are effective to indicate the frequency and the amplitude of the mechanical vibration and may comprise a conventional wave analyzer having a screen 67 on which the pattern of the cathode ray tube is projected.

In order to employ this apparatus for testing the panel 11, surface 25 of the coupler 21 is placed in intimate contact with the foam side of the panel. The oscillator 27 is then energized and the dial adjusted so as to cause the frequency of the oscillator to gradually increase across the frequency spectrum that is being scanned. In operation, it will be apparent that when the oscillator 27 is energized magnet 45 will be alternately attracted to and repelled from the solenoid 53 at a frequency determined by the setting of dial 37. The mechanical vibrations generated by this action are transmitted through the coupler 21 to the foam composite 15 so as to cause the foam to vibrate. The vibrations induced in the foam composite 15 are in turn reflected back to the coupler 21 where they are sensed by the microphone 59.

At some particular setting of dial 37, the frequency of the mechanical vibrations transmitted to the panel 11 will be equal to the resonant frequency of the panel and the amplitude of these mechanical vibrations will increase beyond some predetermined amplitude. The amplitude and frequency of these vibrations may be observed on the screen 67 of the wave analyzer 61. In the case of the panel illustrated in FIGS. 1 and 2, it has been found that the presence or absence of a bond between the foam composite and the metal plate introduces but a slight change in the frequency of the resonant frequency however, a principle change is observed in the amplitude of the resonant peak.

Figure 3:
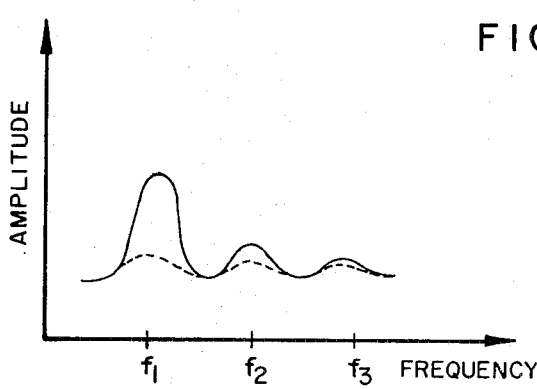
FIG. 3 shows a curve of the variations versus frequency of the amplitude of resonant frequencies.

This is most clearly understood by reference to FIG. 3 wherein there is shown a graph of the variations, versus frequency of the amplitude of the mechanical vibrations induced in the coupler 21 as sensed by the microphone and viewed on the screen of the wave analyzer. In FIG. 3, the full line curve corresponds to a nonbonded area whereas the dotted line corresponds to a bonded area. In FIG. 3, $f_1$ is the fundamental resonant frequency while $f_2$, $f_3$ correspond to successive harmonics of the resonant frequency. As will be readily apparent from inspection of FIG. 3, a nonbonded area is clearly shown by the increase in the amplitude of the resonant peak of the resonant frequency $f_1$, which increase is a result of lack of dampening or absorption of the mechanical vibrations at an area that is not bonded.

Although the present invention has been specifically described, for purposes of illustration, as being used in testing panels consistings of a plate of metal to which is sprayed a foam composite, it is obvious that it also finds utility in the testing of panels of a wide variety of other kinds of materials. The nature and scope of the present invention having been indicated and the preferred embodiment of the invention having been specifically described, what is claimed is:

1. An inspection device for determining the existence of nonexistence of a bond in a panel of a high density material bonded to a low density material comprising:
   a variable frequency oscillator having an output circuit;
   a coupler, consisting of a material having a predetermined mechanical impedance approximating the mechanical impedance of said low density material, said coupler disposed on the surface of said low density material so as to transmit mechanical vibrations induced in said coupler to said panel and to receive back reflections therefrom;
   electro-mechanical transducer means connected to said output circuit of said oscillator and adapted to induce mechanical vibrations in said coupler;
   means for varying the frequency of said oscillator until it coincides with the resonant frequency of said panel;
   vibration detecting means responsive to the amplitude vibrations induced in said coupler and adapted to produce a signal in accordance therewith; and
   means responsive to said signal for indicating the amplitude of said signal.

2. The device of claim 1 wherein said electro-mechanical transducer includes a driven element consisting of a magnetic material disposed in contact with said coupler and an electromagnet, having an input connected to the output circuit of said oscillator, mounted on said coupler in coacting relationship with said driven element so as to alternately attract and repel said driven element in accordance with the frequency of said oscillator.

3. The device of claim 1 wherein said electro-mechanical transducer includes a driven element consisting of a magnetic material secured to said coupler and an electromagnet, having an input connected to the output circuit of said oscillator, mounted on said coupler in coacting relationship with said driven element so as to alternately attract and repel said driven element in accordance with the frequency of said oscillator.

4. The device of claim 1 wherein said coupler comprises a body having a first end presenting a first surface adapted to be disposed in contact with said low density material, said body having a cavity spaced from said first end presenting a second surface parallel to said first surface and said pickup means comprises a microphone secured to said second surface.

5. The device of claim 4 wherein said electro-mechanical transducer means includes a driven element consisting of a magnetic material secured to the end of said body opposite said first end and an electromagnet, having an input connected to the output of said oscillator, mounted on said opposite end in coacting relationship with said driven element so as to alternately attract and repel said driven element in accordance with the frequency of said oscillator.

6. The device of claim 5 wherein said driven element comprises a permanent magnet.

References Cited

UNITED STATES PATENTS

| | | | |
|---|---|---|---|
| 2,903,886 | 9/1959 | Renaut. | |
| 3,016,735 | 1/1962 | Arnold et al. | 73—67.1 |
| 3,058,539 | 10/1962 | Adler | 73—67.1 XR |
| 3,335,602 | 8/1967 | Martner | 73—67.1 |

JAMES J. GILL, Primary Examiner

U.S. Cl. X.R.

73—71.5